US011255376B2

(12) United States Patent
Richter et al.

(10) Patent No.: US 11,255,376 B2
(45) Date of Patent: Feb. 22, 2022

(54) BALL SOCKET FOR A BALL JOINT (71) Applicant: ZF Friedrichshafen AG, Friedrichshafen (DE)

(72) Inventors: Thomas Richter, Damme (DE); Hans Prins, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 306 days.

(21) Appl. No.: 16/348,651

(22) PCT Filed: Oct. 24, 2017

(86) PCT No.: PCT/EP2017/077078
§ 371 (c)(1),
(2) Date: May 9, 2019

(87) PCT Pub. No.: WO2018/099653
PCT Pub. Date: Jun. 7, 2018

(65) Prior Publication Data
US 2019/0285114 A1    Sep. 19, 2019

(30) Foreign Application Priority Data

Dec. 2, 2016    (DE) ..................... 10 2016 224 045.5

(51) Int. Cl.
*F16C 11/06*    (2006.01)
(52) U.S. Cl.
CPC ...... *F16C 11/0638* (2013.01); *F16C 2240/40* (2013.01); *F16C 2240/60* (2013.01); *F16C 2240/70* (2013.01)
(58) Field of Classification Search
CPC .............. F16C 11/0623; F16C 11/0628; F16C 11/0633; F16C 11/0638; F16C 2220/04;
(Continued)

(56) References Cited

U.S. PATENT DOCUMENTS 3,210,105 A    10/1965    Vogt
3,231,299 A *  1/1966    Birney ................ F16C 11/0633
                                                    403/139
(Continued)

FOREIGN PATENT DOCUMENTS

DE       3149628 A1 *  7/1983   .......... F16C 11/0628
DE    201 07 002 U1     9/2001
(Continued)

OTHER PUBLICATIONS

German Office Action Corresponding to 10 2016 224 045.5 dated Aug. 8, 2018.
(Continued)

*Primary Examiner* — Josh Skroupa
(74) *Attorney, Agent, or Firm* — Finch & Maloney, PLLC; Michael Bujold; Jay Franklin (57) ABSTRACT

A socket for a ball joint having a socket body with an opening and a hollow space, which comprises a concave inside peripheral surface that delimits the hollow space and extends around a longitudinal axis, and which is axially divided into two body halves which merge together in a transition zone, each of which comprises an inside peripheral surface half. A first body half comprises a first inside peripheral surface half which lies on a spherical surface and is closed, in the circumferential direction, and a second body half which comprises the socket opening, at least one slot extending axially and a second inside peripheral surface half which is closed in the circumferential direction, or closed apart from the slot. The second body half is designed such that the second inside peripheral surface half lies outside the spherical surface at least an axial distance away from the transition zone.

13 Claims, 3 Drawing Sheets

(58) Field of Classification Search
CPC .............. F16C 2240/40; F16C 2220/60; F16C 2220/70; Y10T 403/32721; Y10T 403/32737; Y10T 403/32778
USPC ........................................ 403/133, 135, 140
See application file for complete search history.

(56) References Cited

U.S. PATENT DOCUMENTS

| | | | | |
|---|---|---|---|---|
| 3,787,129 | A * | 1/1974 | Kohler | F16C 11/0619 403/135 |
| 4,537,524 | A * | 8/1985 | Hanson | F16C 11/0638 403/135 |
| 5,499,570 | A * | 3/1996 | Bergelin | B60T 13/52 403/133 |
| 5,697,723 | A * | 12/1997 | Wood | F16C 11/0638 403/135 |
| 6,398,446 | B1 * | 6/2002 | Pazdirek | F16C 11/0633 403/135 |
| 6,488,436 | B1 | 12/2002 | Modat | |
| 6,902,344 | B2 | 6/2005 | Raak et al. | |
| 6,945,682 | B2 * | 9/2005 | Cramer | B60Q 1/068 403/135 |
| 7,188,563 | B2 * | 3/2007 | Liebig | F16C 11/0623 403/141 |
| 9,291,194 | B2 * | 3/2016 | Strobel | F16C 11/0638 |
| 9,476,447 | B2 * | 10/2016 | Schmidt | F16C 11/0685 |

FOREIGN PATENT DOCUMENTS

| | | | |
|---|---|---|---|
| DE | 102006045809 A1 * | 4/2008 | .......... F16C 11/0638 |
| EP | 0 379 392 A1 | 7/1990 | |
| FR | 1 292 538 | 5/1962 | |
| FR | 2 789 359 A1 | 8/2000 | |
| FR | 2970052 A1 * | 7/2012 | .......... F16C 11/0638 |
| WO | 2011/021217 A1 | 2/2011 | |

OTHER PUBLICATIONS

International Search Report Corresponding to PCT/EP2017/077078 dated Feb. 23, 2018.
Written Opinion Corresponding to PCT/EP2017/077078 dated Feb. 23, 2018.

* cited by examiner

BALL SOCKET FOR A BALL JOINT

This application is a National Stage completion of PCT/EP2017/077078 filed Oct. 24, 2017, which claims priority from German patent application serial no. 10 2016 224 045.5 filed Dec. 2, 2016.

FIELD OF THE INVENTION

The invention relates to a ball socket for a ball joint, having a ball socket body comprising a ball socket opening and a hollow space, which has a concave inside peripheral surface that delimits the hollow space and extends around a longitudinal axis orientated in an axial direction, and is divided along the longitudinal axis into two ball socket body halves arranged one behind the other, which merge into one another in a transition zone, each of which has an inside peripheral surface half of the inside peripheral surface that extends around the longitudinal axis, wherein a first one of the ball socket body halves contains a first one of the inside peripheral surface halves, which lies on a spherical surface and is closed in the circumferential direction, and a second one of the ball socket body halves which comprises the ball socket opening, at least one slot extending in the direction of the longitudinal axis and a second one of the inside peripheral surface halves, which is closed in the circumferential direction or formed closed except for the slot.

BACKGROUND OF THE INVENTION

Slotted ball sockets are known from the prior art, wherein for example the slot extends over the full height of the ball socket. After fitting into the joint housing the slot is not closed, but as a rule orientated in a direction transverse to the loading direction of the ball joint. In the course of wear tests, however, it has been found that under high loads, for example at surface pressures in excess of 130 MPa, the material of the ball socket flows into the area of the slot. This is undesirable, since thereby the geometry of the ball socket and hence the preset bearing properties of the ball joint are changed.

SUMMARY OF THE INVENTION

Starting from there, the purpose of the present invention is to provide a slotted ball socket whose slot can be closed during the assembly of the ball joint.

This objective is achieved by a ball socket according to independent claim(s). Preferred further developments of the ball socket are indicated in the subordinate claims and in the description that follows.

The ball socket for a ball joint comprises a ball socket body with a ball socket opening and a hollow space, which has a concave inside peripheral surface that delimits the hollow space and extends around a longitudinal axis orientated in an axial direction, and which is divided along the longitudinal axis into two ball socket body halves arranged one behind the other, which merge into one another in a transition zone, each of which has an inside peripheral surface half of the inside peripheral surface which extends around the longitudinal axis, wherein a first one of the ball socket body halves has a first one of the inside peripheral surface halves which lies on a spherical surface and is closed in the circumferential direction, and a second one of the ball socket body halves which comprises the ball socket opening, one or at least one slot extending in the direction of the longitudinal axis, and a second one of the inside peripheral surface halves, which in the circumferential direction is closed or closed apart from the slot, wherein the second ball socket body half is designed in such manner that the second inside peripheral surface half lies outside the ball surface, in particular an axial distance away from the transition zone.

Thus, the second ball socket body half can be deformed and the slot thereby closed, after which the second inside peripheral surface half preferably rests against the surface of the ball. In particular, the second ball socket body half is preferably an axial distance away from the transition zone larger in relation to the spherical surface than the first ball socket body half or the first ball socket body half in the transition zone.

Preferably, when fitting the ball socket into a joint housing or a ball joint, the ball socket body is pressed with its second ball socket body half, preferably in the direction of the longitudinal axis, against a preferably concave counterface provided inside the joint housing, so that the second ball socket body half is deformed and the slot is closed. During this the second ball socket body half is in particular deformed in such manner that the second inside peripheral surface half lies on the spherical surface. The ball joint is preferably provided for a vehicle, in particular a motor vehicle, Advantageously, the ball joint is provided for fitting into a chassis of the vehicle, or of a vehicle or motor vehicle.

Preferably, during, for, or prior to the fitting of the ball socket into the joint housing, a joint ball is inserted and/or fitted into the ball socket body and/or the hollow space. In particular, the inside peripheral surface forms a bearing surface for the joint ball, or for a joint ball of the ball joint, or of a ball joint. Preferably, the inside peripheral surface serves to hold the joint ball so that it can move by sliding. Advantageously, the surface of the joint ball lies, in particular at least partially, against the spherical surface. The joint ball is preferably provided on a ball stud of the ball joint. Preferably, during, for, or prior to the fitting of the ball socket into the joint housing the ball stud with its joint ball is inserted and/or fitted into the ball socket body and/or into the hollow space in such manner that it extends out of the ball socket body. Advantageously, the ball socket and the ball stud are fitted into the joint housing in such manner that the ball stud extends out of the joint housing, in particular through a housing opening provided in the joint housing.

The spherical surface is preferably a fictive surface and/or in particular forms no real body surface of the ball socket and/or the ball socket body. Advantageously, the spherical surface is associated with a mid-point of the ball. In the, or in a fitted condition of the ball socket in the joint housing, the mid-point of the spherical surface preferably coincides with the mid-point of the joint ball. The inside peripheral surface half is preferably a partial hollow-spherical surface whose mid-point coincides in particular with the mid-point of the spherical surface.

A radial direction is in particular a direction or any direction that passes through the mid-point of the joint ball. Furthermore, a circumferential direction is a direction which preferably extends along a circular curve around the longitudinal axis.

In one embodiment the second inside peripheral surface half, in particular in the transition zone or at least an axial distance away therefrom, has an inside peripheral surface distance from the mid-point of the spherical surface which is preferably larger than the radius of the spherical surface. The second inside peripheral surface half preferably lies completely within, or at least in an inside peripheral surface region of the second inside peripheral surface half which is outside the spherical surface, this inside peripheral surface region advantageously being an axial distance away from the transition zone. In particular the inside peripheral surface region of the second inside peripheral surface half preferably extends in the direction of the longitudinal axis as far as the ball socket opening. Preferably, the inside peripheral surface region of the second inside peripheral surface half is a distance away from the mid-point of the spherical surface, which distance is larger than the radius of the spherical surface.

Preferably, the slot has a slot width in the circumferential direction. For example, in the direction of the longitudinal axis the slot width is constant. In that case, for example, the inside peripheral surface distance of the second inside peripheral surface half and/or of the inside peripheral surface region of the second inside peripheral surface half in the direction of the longitudinal axis is also constant. In one variant, however, the inside peripheral surface distance of the second inside peripheral surface half and/or of the inside peripheral surface region of the second peripheral surface half varies in the direction of the longitudinal axis. Alternatively, for example, the slot width varies in the direction of the longitudinal axis. In that case, in particular the inside peripheral surface distance of the second inside peripheral surface half and/or of the inside peripheral surface region of the second inside peripheral surface half also varies in the direction of the longitudinal axis, preferably as a function of and/or proportionally to the slot width. Preferably the, or the respective inside peripheral surface distance of the second inside peripheral surface half and/or of the inside peripheral surface region of the second inside peripheral surface half, for example at or in the area of the hall socket opening, is larger than the radius of the spherical surface by an amount and/or a length difference that depends on the slot width or the slot width concerned. Advantageously, the amount and/or length difference that depends on the slot width concerned corresponds to the quotient of half of the, or the respective, slot width and the circle number Pi. Preferably, the amount and/or length difference that depends on the slot width or the slot width concerned is obtained from half the slot width or slot width concerned divided by the circle number Pi. Preferably, the amount and/or length difference that depends on the slot width is obtained from half the slot width or slot width concerned divided by the circle number Pi. This in particular can ensure that after fitting the ball socket into the joint housing and/or after deforming the second ball socket body half, and/or after closing the slot, the second inside peripheral surface half lies on the spherical surface so that preferably the inside peripheral surface as a whole lies on the spherical surface.

According to a further development the ball socket body has an outer circumferential surface, in particular extending around the longitudinal axis. Preferably, the ball socket body halves each have an outer circumferential surface corresponding to half of the outer circumferential surface, which extends in particular around the longitudinal axis. Preferably, the first ball socket body half has a first one of the outer circumferential surface halves, which in particular is closed in the circumferential direction. Preferably, the second ball socket body half has a second one of the outer circumferential surface halves, which in particular is closed in the circumferential direction, or closed apart from the slot. Advantageously, the second outer circumferential surface half is convex. Preferably, in particular at or at least an axial distance away from the transition zone, the second outer circumferential surface half has an outer circumferential surface distance away from the mid-point of the spherical surface which is larger than the distance of the first outer circumferential surface half in the transition zone from the mid-point of the spherical surface. For example, the slot width is constant in the direction of the longitudinal axis. In that case, for example, the outer circumferential surface distance of the second outer circumferential surface half is also constant in the direction of the longitudinal axis. In a variant, however, the outer circumferential surface distance of the second outer circumferential surface half varies in the direction of the longitudinal axis. Alternatively, for example the slot width varies in the direction of the longitudinal axis. In that case, in particular the outer circumferential surface distance of the second outer circumferential surface half also varies, preferably as a function of and/or proportionally to the slot width. Preferably the, or the respective outer circumferential surface distance of the second outer circumferential surface half, for example at or in the area of the ball socket opening, is larger by an amount and/or a length difference that depends on the, or the respective slot width than the distance of the first outer circumferential surface half in the transition zone from the mid-point of the spherical surface. In this way it can in particular be ensured that when the ball socket is fitted into the joint housing, the second ball socket body half will be deformed by the pressure of the ball socket against the counterface to an extent sufficient for the second inside peripheral surface half to lie against the ball surface and/or for the slot to be closed.

In one embodiment the ball socket body has a wall which encloses, or at least partially encloses in particular the hollow space. The wall preferably comprises the inside peripheral surface and/or the outer circumferential surface. Preferably, the wall extends around the longitudinal axis. The slot is preferably provided in the wall and/or preferably extends through it. Advantageously, the ball socket opening is provided in the wall and/or the opening advantageously extends through the wall. Preferably, each of the ball socket body halves comprises a wall half of the wall, in particular extending round the longitudinal axis, Preferably, the first ball socket body half comprises a first one of the wall halves, which in particular is closed in the circumferential direction. Preferably, the second ball socket body half comprises a second one of the wall halves. The slot is in particular provided in the second wall half and/or extends in particular through the second wall half. Advantageously, the ball socket opening is provided in the second wall half and/or the ball socket opening advantageously extends through the second wall half. Preferably the first wall half comprises the first inside peripheral surface half and/or the first outer circumferential surface half. Advantageously, the second wall half comprises the second inside peripheral surface half and/or the second outer circumferential surface half. In particular, the second wall half is closed in the circumferential direction, or closed apart from the slot. Advantageously, the thickness of the wall in the second ball socket body half, particularly in the direction of the longitudinal axis, is constant or approximately constant. Preferably, the thickness of the second wall half is constant or approximately so, particularly in the direction of the longitudinal axis. The thickness of the wall can for example also be regarded as the thickness of the wall material. Preferably, in the transition zone the thickness of the wall in the second ball socket body haft corresponds to the thickness of the wall in the first ball socket body half. Particularly in the transition zone the thickness of the first wall half corresponds to the thickness of the second wall half. In this way too it can in particular be ensured that when ball socket is fitted into the joint housing, owing to the pressure of the ball socket against the counterface the second ball socket body half will be deformed sufficiently for the second inside peripheral surface half to lie against the ball surface and/or for the slot to be closed.

The ball socket opening is preferably provided at an axial end of the ball socket body and/or the wall. In particular, the ball socket opening merges into the hollow space. Advantageously, the ball socket body has a base at an end axially opposite the ball socket opening. The base is preferably provided at another axial end of the ball socket body and/or of the wall. The base has, for example, a collar projecting outward transversely to the longitudinal axis and in particular extending around the longitudinal axis, which is preferably an annular collar. When the ball socket is fitted into the joint housing, the collar is for example in contact with a contact surface provided on or in the joint housing. Preferably the ball socket body has a base opening, in particular axially opposite the ball socket opening. Advantageously, the base opening is provided in the base and/or on the axial end, or on another axial end of the ball socket body and/or of the wall. In particular, the base opening merges into the hollow space.

Preferably, the slot extends particularly in the direction of the longitudinal axis, from the ball socket opening as far as an end of the slot preferably located in the second ball socket body half. However, the specific length of the slot, preferably in the direction of the longitudinal axis, depends in particular on the degree of deformation of the ball socket and/or the ball socket body and/or the second ball socket body half when the ball socket is fitted into the joint housing. For example, the end of the slot is an axial distance away from the transition zone. Preferably, however, the end of the slot is in the transition zone. In particular the slot extends, preferably in the direction of the longitudinal axis, from the ball socket opening as far as the transition zone, Preferably, the end of the slot defines the transition zone.

In the circumferential direction the slot has, in particular, a slot width or the slot width. For example, the slot width is constant, preferably in the direction of the longitudinal axis. With a constant slot width, however, particularly in the direction of the longitudinal axis, complete closing of the slot when fitting the ball socket into the joint housing can be made more difficult. Preferably the slot width of the slot tapers, preferably steadily, particularly in the direction of the longitudinal axis, starting from the ball socket opening in the direction toward the transition zone and/or as far as the transition zone. This measure can in particular facilitate and/or ensure that the slot is closed completely when the ball socket is fitted into the joint housing. For example, at the end of the slot and/or in the transition zone the slot width of the slot is reduced to zero or approximately zero.

According to a further development, the inside peripheral surface distance of the second inside peripheral surface half and/or of the inside peripheral surface region of the second inside peripheral surface half is reduced, specifically in the direction of the longitudinal axis, starting from the ball socket opening in the direction toward the transition zone and/or as far as the end of the slot, preferably as a function of and/or proportionally to the slot width. Advantageously, the inside peripheral surface distance of the second inside peripheral surface half and/or of the inside peripheral surface region of the second inside peripheral surface half is reduced, specifically in the direction of the longitudinal axis, starting from the ball socket opening as far as the transition zone, preferably as a function of and/or proportionally to the slot width, Preferably, the inside peripheral surface distance of the second inside peripheral surface half and/or of the inside peripheral surface region of the second inside peripheral surface half at the end of the slot and/or in the transition zone corresponds to the radius of the spherical surface.

Preferably, each curve lying on the second inside peripheral surface half and extending in the direction of the longitudinal axis is a circular arc whose radius is larger than the radius of the spherical surface, so that the mid-point of the, or of each circular arc, in particular transversely to the longitudinal axis, is offset relative to the mid-point of the spherical surface. Preferably, in or close to the transition zone, or in or close to the area of the end of the slot the circular arc, or each circular arc, intersects the spherical surface. Advantageously, at or in the area of the ball socket opening the, or each circular arc is a distance away from the mid-point of the spherical surface that corresponds in particular to a sum of the radius of the spherical surface and a length difference. Advantageously, the length difference corresponds to half the slot width divided by the circle number Pi. For example, this length difference corresponds to the amount and/or length difference that depends on the slot width concerned, particularly at or near the ball socket opening. Furthermore, the distance preferably corresponds to the inside peripheral surface distance at or in the area of the ball socket opening.

In a radial direction relative to the mid-point of the spherical surface and/or in a direction transverse to the longitudinal axis, the slot preferably has a slot depth. In particular, the slot depth corresponds at least approximately to the thickness of the wall in the second ball socket body half and/or to the thickness of the second wall half.

In the transition zone and/or in the area of the end of the slot, specifically in relation to its inside diameter and/or its outside diameter, the first ball socket body half merges preferably continuously and/or steadily into the second ball socket body half. Preferably, in the transition zone, particularly in relation to its diameter or inside diameter, the first inside peripheral surface half merges preferably continuously and/or steadily into the second inside peripheral surface half. Moreover, in the transition zone and particularly in relation to its diameter or outer diameter, the first outer circumferential surface half merges preferably continuously and/or steadily into the second outer circumferential surface half.

According to a further development, the ball socket and/or the ball socket body is an injection-molded component produced in an injection molding die. In the injection molding die the slot is formed in particular by one or at least one projection of the injection molding die, which can wear down rapidly for example when it comes into contact with another part of the die. For that reason the projection is preferably shorter than the slot depth and/or the thickness of the wall in the area of the slot, so that after the injection-molding process a skin remains in the slot. Thus, in the injection-molding die the slot is closed by the skin, or by a skin. In particular the skin is thinner than the slot depth and/or the thickness of the wall in the area of the slot. When the ball socket and/or the ball socket body is released from the injection-molding die the skin splits, so that after the release of the ball socket and/or the ball socket body the slot is in particular through-going in the radial direction or in a radial direction relative to the mid-point of the spherical surface and/or in the direction or in a direction extending transversely to the longitudinal axis.

In one embodiment the slot is of stepped form in the, or in a radial direction relative to the mid-point of the spherical surface and/or in the, or in a direction transverse to the longitudinal axis. In that case the slot is formed in the injection-molding die in particular by two projections of the injection-molding die arranged opposite but offset from one another. Thus the projections can be made shorter, which reduces the risk of wearing down the projection. For example, the length of the projections corresponds in each case to half the slot depth and/or half the thickness of the wall in the area of the slot. Preferably however, the projections are shorter than half the slot depth and/or half the wall thickness in the area of the slot, so that after injection molding the skin, or a skin remains. In particular the skin is thinner than half the slot width and/or half the wall thickness in the area of the slot. When releasing the ball socket and/or the ball socket body from the injection-molding die, the skin preferably splits, so that after the release the slot is in particular not closed by the skin.

The slot of stepped form preferably comprises two slot halves, specifically extending in the direction of the longitudinal axis, which are arranged offset relative to one another in the circumferential direction. In the injection-molding die the skin preferably sits between the slot halves. Advantageously, a first one of the slot halves is accommodated in the second outer circumferential surface half. Preferably, a second one of the slot halves is accommodated in the second inside peripheral surface half.

Preferably, each slot half extends in particular in the direction of the longitudinal axis, from the ball socket opening as far as a slot half end preferably located in the second ball socket body half. For example, the slot half end of each slot half is an axial distance away from the transition zone. Preferably, however, each slot half end is in the transition zone. In particular, each slot half preferably extends in the direction of the longitudinal axis, from the ball socket opening as far as the transition zone. Preferably, particularly in the direction of the longitudinal axis the slot halves are of equal length. Preferably the slot half ends define or form the slot end.

In the circumferential direction each slot half has in particular a slot half width. For example, the slot half width of each slot half is constant, particularly in the direction of the longitudinal axis. Preferably however each slot half width tapers, especially in the direction of the longitudinal axis, starting from the ball socket opening in the direction toward the transition zone and/or as far as the respective slot half end, preferably steadily. In particular the slot half width of each slot half tapers, particularly in the direction of the longitudinal axis, starting from the ball socket opening toward the transition zone, preferably steadily. For example, the slot half width of each slot half is reduced to zero or approximately zero at each slot half end and/or in the transition zone.

In particular, in the circumferential direction the slot halves have the same, or respectively the same slot half width. Preferably, in the circumferential direction the slot halves are arranged offset relative to one another by, or approximately by the slot half width concerned. Thus, for the stepped slot a resulting slot width is obtained, which in particular corresponds to the slot half width, or to the respective slot half width, or approximately so.

Preferably, in the radial direction or in a radial direction relative to the mid-point of the spherical surface and/or in the transverse direction, or in a direction transverse to the longitudinal axis, each slot half has a slot half depth. Thus, for the stepped slot a resulting slot depth is obtained, which in particular corresponds or approximately corresponds to the sum of the slot half depths. Preferably the slot halves have the same slot half depth. In particular, each slot half depth corresponds or approximately corresponds to half the thickness of the wall in the second ball socket body half and/or half the thickness of the second wall half.

Preferably, the ball socket body is an integral and/or monolithic component. In particular, in the transition zone the ball socket body halves merge material-homogeneously and/or in a material-merged way into one another. The ball socket body preferably consists of plastic, for example a thermoplastic plastic.

Advantageously, relative to the longitudinal axis the ball socket and/or the ball socket body and/or the wall and/or the inside peripheral surface and/or the outer circumferential surface and/or the first ball socket body half and/or the second ball socket body half and/or the first inside peripheral surface half and/or the second inside peripheral surface half and/or the first outer circumferential surface half and/or the second outer circumferential surface half and/or the first wall half and/or the second wall half are in each case rotationally symmetrical or essentially rotationally symmetrical or each formed rotationally symmetrically or in each case essentially rotationally symmetrically.

BRIEF DESCRIPTION OF THE DRAWINGS

Below, the invention is described on the basis of a preferred embodiment, with reference to the drawing, which shows.

DETAILED DESCRIPTION OF THE PREFERRED EMBODIMENTS

Figure 1:
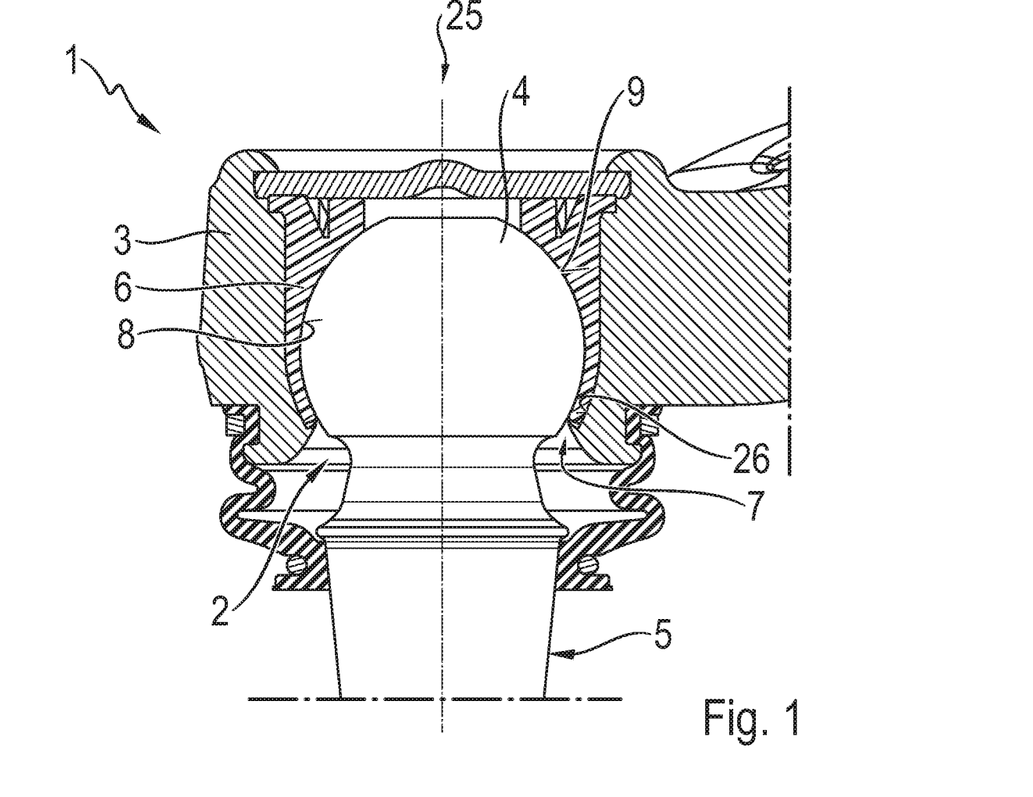
FIG. 1: A sectioned view of a ball joint with a ball socket according to a first embodiment.

FIG. 1 shows a sectioned view of a ball joint 1, which comprises a joint housing 3 with a housing opening 2 and a ball stud 5 with a joint ball 4, which with its joint ball is fitted into the joint housing 3 with a ball socket 6 interposed and which extends out of the housing through the housing opening 2. The joint ball 4 sits inside the ball socket 6, which has a ball socket opening 7 through which the ball stud 5 extends out of the ball socket 6. Furthermore, the ball socket 6 has an inside peripheral surface 8 against which the joint ball 4 rests and can move by sliding. In the assembled condition of the ball socket 6 shown in FIG. 1 the inside peripheral surface 8 as a whole lies on a spherical surface 9, which in the fitted condition of the ball joint 1 coincides with the surface of the joint ball 4.

Figure 2:
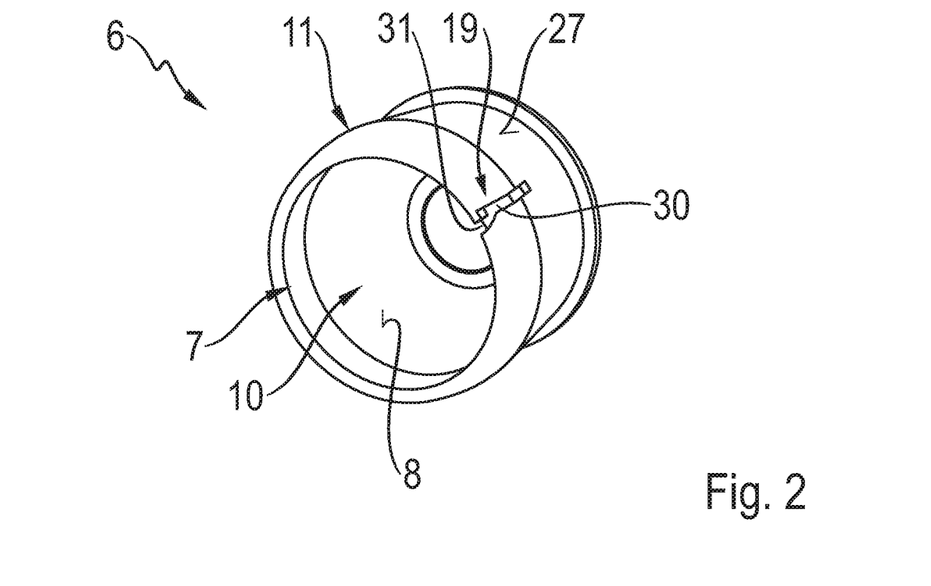
FIG. 2: A perspective representation of the ball socket according to the first embodiment, before being fitted into the ball joint.
Figure 3:
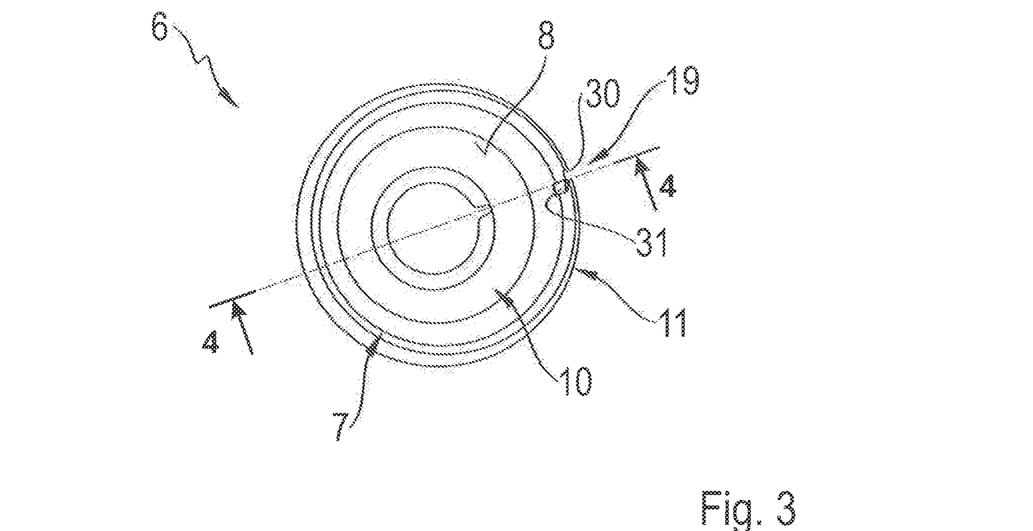
FIG. 3: A view from above, of the ball socket according to the first embodiment before being fitted into the ball joint.

FIG. 2 shows a perspective representation of the ball socket 6 before it is fitted into the joint housing 3, whereas FIG. 3 shows a view of the ball socket 6 from above before it has been fitted into the joint housing 3. Furthermore, FIG. 4 shows a section through the ball socket 6 along the line shown in FIG. 3.

The ball socket 6 comprises a ball socket body 11 with a ball socket opening 7 and a hollow space 10, containing the inside peripheral surface 8 that delimits the hollow space 10 and extends around a longitudinal axis 13 of the ball socket body 11 orientated in an axial direction. Before fitting the ball socket 6 into the joint housing 3, it is true that the inside peripheral surface 8 is concave but it is not completely spherically-symmetrical, as will be explained later.

The ball socket body 11 is divided along the longitudinal axis 13 into two ball socket body halves 15 and 16 arranged one behind the other and which merge into one another in a transition zone 14, each comprising an inside peripheral surface half, respectively 17 and 18, of the inside peripheral surface 8 and each extending around the longitudinal axis 13. A first one of the ball socket body halves 15 comprises a first one of the inside peripheral surface halves 17, which lies on the spherical surface 9 and is closed in the circumferential direction. In addition, a second one of the ball socket body halves 16 comprises the ball socket opening 7, a slot 19 extending in the direction of the longitudinal axis 13 and a second one of the inside peripheral surface halves 18, which is closed in the circumferential direction, or closed apart from the slot 19. Here, the second inside peripheral surface half 18 is of concave shape.

Figure 4:
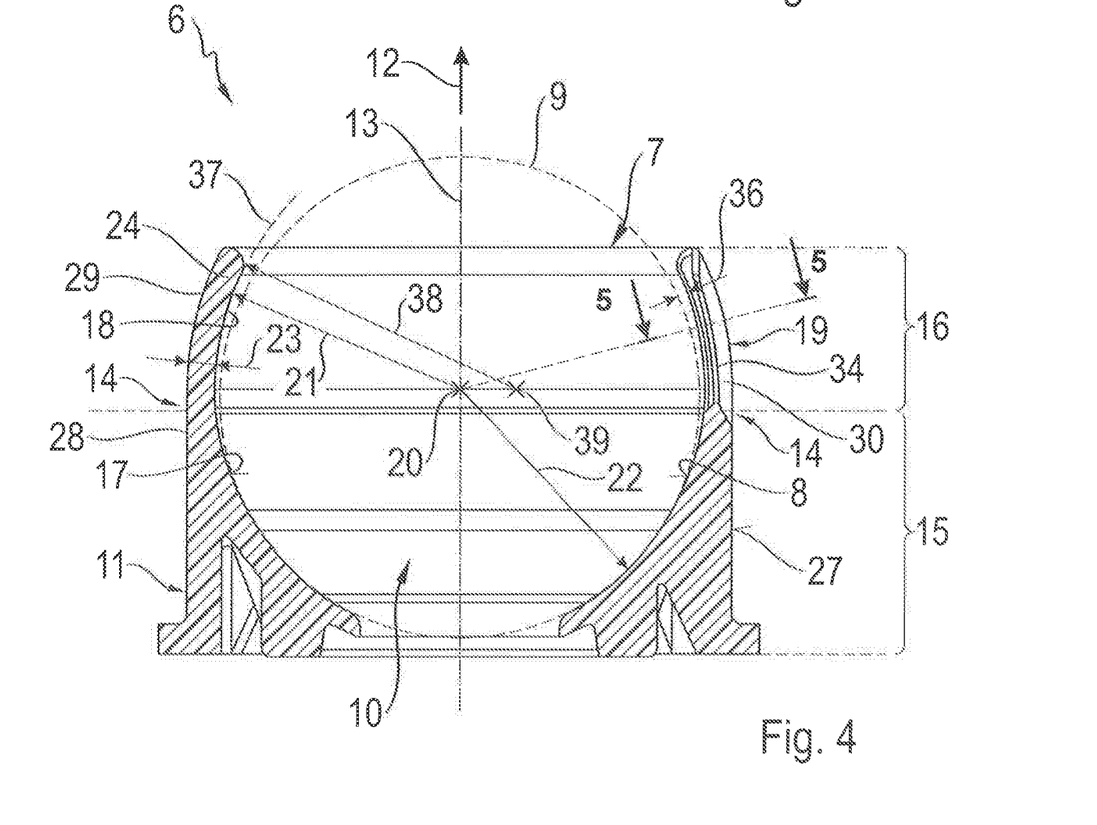
FIG. 4: A sectioned view of the ball socket according to the first embodiment, along the section line 4-4 shown in FIG. 3, FIG. 5: A sectioned view of the ball socket according to the first embodiment, along the section line 5-5 shown in FIG. 4, and FIG. 6: A side view of a ball socket according to a second embodiment, before being fitted into a ball joint.

As can be seen in particular in FIG. 4, the second ball socket body half 16 is designed such that the second inside peripheral surface half 18 lies outside the spherical surface 9 an axial distance away from the transition zone 14. Thus, at an axial distance away from the transition zone 14 the inside peripheral surface half 18 is an inside peripheral surface distance 21 from a mid-point 20 of the spherical surface 9, this distance being larger than the radius 22 of the spherical surface 9. Moreover, since the thickness 23 of the wall 24 of the ball socket body 11 is constant in the second ball socket body half 16 and matches the thickness of the wall 24 of the ball socket body 11 in the first ball socket body half 15 in the transition zone 14, the second ball socket body half 16 in its axial distance to the transition zone 14, in relation to the mid-point 20 of the spherical surface, is larger than the first ball socket body half 15 in the transition zone 14.

When the ball socket 6 is fitted into the joint housing 3 and during this the ball socket body 11 with its second ball socket body half 16 is pressed in the direction of the arrow 25 against a concave counterface 26 within the joint housing 3, the aforesaid larger size of the second ball socket body half 16 causes the second ball socket body half 16 to be deformed due to the pressure, so that the second inside peripheral surface half 18 lies on the spherical surface 9 and the slot 19 is closed.

Furthermore the ball socket body 11 has an outer circumferential surface 27, such that the first ball socket body half 15 comprises a first outer circumferential surface half 28 of the outer circumferential surface 27 and the second ball socket body half 16 comprises a second outer circumferential surface half 29 of the outer circumferential surface 27. In this case the second outer circumferential surface half 29 is of convex shape. During the aforesaid pressing of the ball socket body 11 with its second ball socket body half 16 in the direction of the arrow 25 against the concave counterface 26, the ball socket body 11, in particular with its second outer circumferential surface half 29, is pressed in the direction of the arrow 25 against the concave counterface 26.

Figure 5:
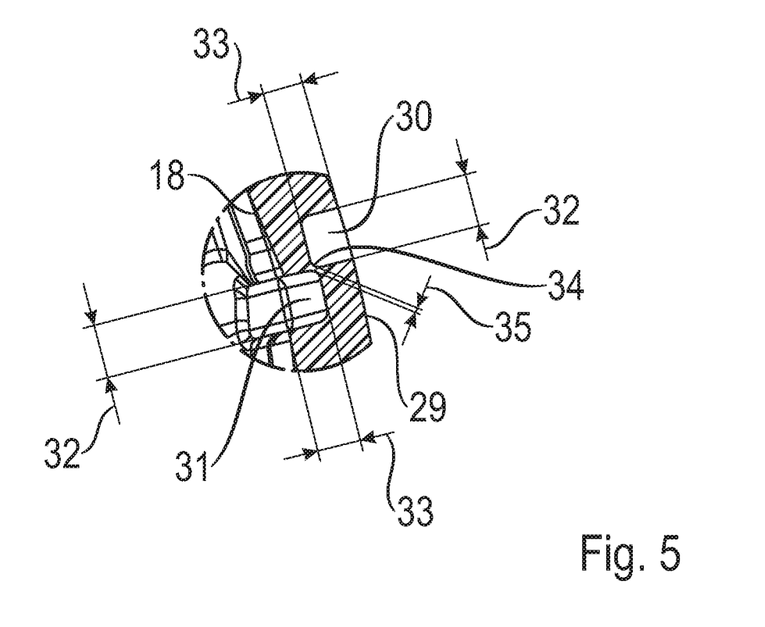

FIG. 5 shows a sectioned view of the ball socket 6 along the section line 5-5 that can be seen in FIG. 4, from which it is clear that the slot 19 consists of two half-slots 30 and 31, such that a first one of the slot halves 30 is formed in the second outer circumferential surface half 29 and a second one of the slot halves 31 is formed in the second inside peripheral surface half 18. In the circumferential direction the slot halves 30 and 31 each have the same slot half width 32. In addition in the circumferential direction the slot halves 30 and 31 are arranged offset from one another, so that the slot 19 is in the form of a stepped slot. Here, the slot halves 30 and 31 are offset from one another in the circumferential direction by the slot half width 32, so that in the circumferential direction the slot 19 has a resultant slot width that corresponds to the slot half width 32. Each of the slot halves 30 and 31 extends in the wall 24 as far or almost as far as the middle of the wall 24, so that the slot halves have the same slot half depth 33. Furthermore, the slot halves 30 and 31 are separated from one another by a thin skin 34, whose thickness 35 is much smaller than the slot half depth 33. The ball socket body 11 is preferably made by injection molding in an injection molding die, and during its release from the die the skin 34 as a rule splits. Thus, after releasing the ball socket body 11 from the injection-molding die, the skin 34 is in particular no longer there.

As can be seen from FIG. 4, the inside peripheral surface distance 21 is larger than the radius 22 of the spherical surface 9 by a length difference 36. In particular, starting from the transition zone 14 the length difference 36 becomes larger in the direction of the longitudinal axis 13 toward the ball socket opening 7. For example, the length difference 36 at or in the area of the ball socket opening 7 corresponds to half of the slot half width 32 divided by the circle number Pi.

Preferably, each curve lying on the second inside peripheral surface half 18 and extending in the direction of the longitudinal axis 13 is a circular arc, one of which is shown, extended and indexed 37. Below, the description relating to the circular arcs is given only with reference to the circular arc 37 shown. In particular however, this description applies analogously to all the circular arcs. The radius 38 of the circular arc 37 is larger than the radius 22 of the spherical surface 9, so that the mid-point 39 of the circular arc 37 is offset transversely to the longitudinal axis 13 relative to the mid-point 20 of the spherical surface 9. Preferably, the circular arc 37 intersects the spherical surface 9 in or close to the transition zone 14. Furthermore, at or in the area of the ball socket opening 7 the circular arc 37 is a distance away from the mid-point 20 of the spherical surface 9, which distance in particular corresponds to the sum of the radius 22 of the spherical surface 9 and the length difference 36 at or in the area of the ball socket opening 7. In particular, that distance also corresponds to the inside peripheral surface distance 21 at or in the area of the ball socket opening 7. Preferably, the length difference 36 at or in the area of the ball socket opening 7 corresponds to half the resulting slot width divided by the circle number Pi, so that here the resulting slot width corresponds in particular to the half slot width 32. Thus, advantageously the length difference at or in the area of the ball socket opening 7 corresponds to half of the slot half width 32 divided by the circle number Pi.

According to a first variation, the slot widths 32 of the slot halves 30 and 31 each taper in the direction of the longitudinal axis 13 starting from the ball socket opening 7 toward the transition zone 14. Thus, in particular the resulting slot width of the slot 19 also tapers in the direction of the longitudinal axis 13, starting from the ball socket opening 7 toward the transition zone 14.

In a second variation, the slot 19 is not of stepped form. Referring to FIG. 5, this can be done for example by not offsetting the two slot halves 30 and 31 relative to one another, but in particular locating them radially opposite one another.

Figure 6:
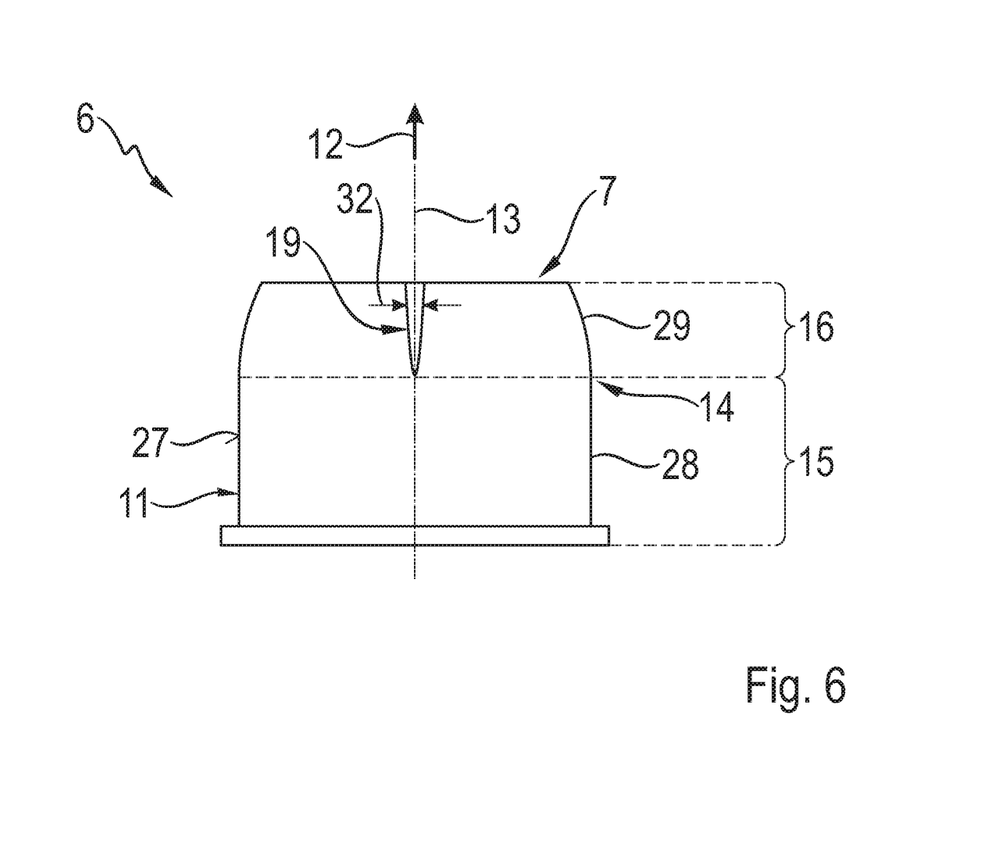

FIG. 6 shows a side view of a ball socket 6; in the figure features identical or similar to those of the first embodiment are given the same indexes. Otherwise than in the first embodiment, the slot width 32 of the slot 19 tapers in the direction of the longitudinal axis 13 starting from the ball socket opening 7 as far as the transition zone 14. Moreover the slot 19 is not a stepped slot, but passes through the wall of the bearing shell body 11 in the radial direction and/or transversely to the longitudinal axis 13. Thus, in particular the slot depth of the slot 19 corresponds to the thickness of the wall. If the skin is present before the release of the ball socket from the injection-molding die, then the slot depth of the slot 10 before release preferably corresponds almost to the thickness of the wall since the skin is preferably provided at a radial end of the slot, for example on the second outer circumferential surface half 29 or on the second inside peripheral surface half 16. Alternatively, for example, before release the skin is provided in the middle of the wall so that before the release the slot 19 has two slot halves, in particular radially opposite one another. Apart from these differences the ball socket of this second embodiment matches the ball socket of the first embodiment, so that for a description of the ball socket according to the second embodiment reference should be made to the description of the ball socket according to the first embodiment. In particular, the ball socket of the second embodiment can replace the ball socket of the first embodiment in the ball joint 1.

For example, the ball socket according to the second embodiment corresponds to the ball socket of the first embodiment and takes into account the first and the second variants.

INDEXES

1 Ball joint
2 Housing opening
3 Joint housing
4 Joint ball
5 Ball stud
6 Ball socket
7 Ball socket opening
8 Inside peripheral surface
9 Spherical surface
10 Hollow space
11 Ball socket body
12 Axial direction
13 Longitudinal axis
14 Transition zone
15 First ball socket body half
16 Second ball socket body half
17 First inside peripheral surface half
18 Second inside peripheral surface half
19 Slot
20 Mid-point of the spherical surface
21 Inside peripheral surface distance
22 Radius of the spherical surface
23 Thickness of the wall
24 Wall of the ball socket body
25 Pressure direction
26 Counterface
27 Outer circumferential surface
28 First outer circumferential surface half
29 Second outer circumferential surface half
30 First slot half
31 Second slot half
32 Slot half width, slot width
33 Slot half depth
34 Skin
35 Thickness of the skin
36 Length difference
37 Circular arc
38 Radius of the circular arc
39 Mid-point of the circular arc

The invention claimed is:

1. A ball socket for a ball joint, the ball socket comprising:
a ball socket body which receives a joint ball, the ball socket body having a ball socket opening and a hollow space, which comprises a concave inside peripheral surface that delimits the hollow space and extends around a longitudinal axis orientated in an axial direction and is divided, along the longitudinal axis, into first and second ball socket body halves, one behind the other, which merge into one another in a transition zone,
each of the first and the second ball socket body halves having an inside peripheral surface half of the inside peripheral surface which extends around the longitudinal axis,
the first ball socket body half comprising a first inside peripheral surface half, which directly mates with a spherical surface of the joint ball and being closed in a circumferential direction,
the second ball socket body half comprising the ball socket opening,
the second ball socket body half having at least one slot extending in a direction of the longitudinal axis, and
the second ball socket body half having a second inside peripheral surface half, which in the circumferential direction is closable, or closed apart from the at least one slot,
the second ball socket body half (16) being designed such that the second inside peripheral surface half (18) lies outside the spherical surface (9) of the joint ball at least at an axial distance away from the transition zone (14), and
a material thickness of the ball socket body, at the ball socket opening is the same as a material thickness of the ball socket body at the transition zone.

2. The ball socket according to claim 1, wherein the second inside peripheral surface half, at least in its axial distance from the transition zone, has an inside peripheral surface distanced from a mid-point of the spherical surface of the joint ball which is larger than a radius of the spherical surface of the joint ball.

3. The ball socket according to claim 2, wherein in the circumferential direction, the at least one slot has a slot width and an inside peripheral surface distance is larger than the radius of the spherical surface of the joint ball by a length difference that depends on the slot width.

4. The ball socket according to claim 1, wherein the ball socket body comprises an outer circumferential surface that extends around the longitudinal axis, the first ball socket body half comprises a first outer circumferential surface half of the outer circumferential surface that extends around the longitudinal axis, and the second ball socket body half comprises a second outer circumferential surface half of the outer circumferential surface that extends around the longitudinal axis, the second outer circumferential surface half is convex and, at least an axial distance away from the transition zone, has an outer circumferential surface distance from a mid-point of the spherical surface of the joint ball which is larger than a distance of the first outer circumferential surface in the transition zone to the mid-point of the spherical surface of the joint ball.

5. The ball socket according to claim 1, wherein the ball socket body has a wall which either encloses or at least partially encloses the hollow space and which comprises the inside peripheral surface (8), in which the slot and the ball socket opening are provided, and
   along the wall in the axial direction, a material thickness of the wall in the second ball socket body half is constant.

6. The ball socket according to claim 5, wherein the material thickness of the wall in the second ball socket body half, in the transition zone, corresponds to a material thickness of the wall in the first ball socket body half.

7. The ball socket according to claim 1, wherein, in the circumferential direction, the at least one slot has a slot width which, starting from the ball socket opening, tapers toward the transition zone.

8. The ball socket according to claim 1, wherein every curve that lies on the second inside peripheral surface half and extends in the direction of the longitudinal axis forms a circular arc, whose radius is larger than a radius of the spherical surface, so that a mid-point of each circular arc is offset transversely to the longitudinal axis relative to a mid-point of the spherical surface of the joint ball.

9. The ball socket according to claim 8, wherein each circular arc in or close to the transition zone intersects the spherical surface of the joint ball and, at or in an area of the ball socket opening, is a distance away from the mid-point of the spherical surface of the joint ball which corresponds to a sum of the radius of the spherical surface of the joint ball and a length difference which corresponds to half a slot width divided by the circle number.

10. The ball socket according to claim 1, wherein the ball socket body is an injection-molded component produced in an injection-molding die, and the at least one slot is closed, in the injection-molding die, by a skin.

11. The ball socket according to claim 1, wherein the at least one slot is of stepped form having a radially inner slot half and a radially outer slot half, and the radially inner slot half is offset from the radially outer slot half in the circumferential direction.

12. A ball socket for a ball joint, the ball socket comprising:
   a ball socket body having a ball socket opening and a hollow space, which comprises a concave inside peripheral surface that delimits the hollow space and extends around a longitudinal axis orientated in an axial direction and is divided, along the longitudinal axis, into first and second ball socket body halves, one behind the other, which merge into one another in a transition zone,
   each of the first and the second ball socket body halves having an inside peripheral surface half of the inside peripheral surface which extends around the longitudinal axis,
   the first ball socket body half comprising a first inside peripheral surface half, which lies on a spherical surface and being closed in a circumferential direction,
   the second ball socket body half comprising the ball socket opening,
   at least one slot extending in a direction of the longitudinal axis,
   a second inside peripheral surface half, which in the circumferential direction is closable, or closed apart from the at least one slot,
   the second ball socket body half being designed such that the second inside peripheral surface half lies outside the spherical surface at least at an axial distance away from the transition zone,
   the second inside peripheral surface half, at least in its axial distance from the transition zone, has an inside peripheral surface distanced from a mid-point of the spherical surface which is larger than a radius of the spherical surface, and
   in the circumferential direction, the at least one slot has a slot width and an inside peripheral surface distance is larger than the radius of the spherical surface by a length difference that depends on the slot width,
   wherein the length difference that depends on the slot width corresponds to a quotient of half the slot width and the circle number.

13. A ball socket for a ball joint, the ball socket comprising:
   a ball socket body which receives a joint ball, the ball socket body having a ball socket opening, a hollow space, and a concave inside peripheral surface that delimits the hollow space and extends around a longitudinal axis orientated in an axial direction, the ball socket body being divided, along the longitudinal axis, into first and second ball socket body halves (15, 16), the first and the second ball socket body halves are aligned along the longitudinal axis and merge into each other in a transition zone;
   the first ball socket body half comprising a first inside peripheral surface half of the inside peripheral surface which directly mates with a spherical surface of the joint ball and is closed in a circumferential direction; and
   the second ball socket body half comprising the ball socket opening, at least one slot that extends in the direction of the longitudinal axis and a second inside peripheral surface half, which in the circumferential direction is closable, or closed except for the at least one slot, the second ball socket body half being designed such that the second inside peripheral surface half lies outside the spherical surface of the joint ball at least an axial distance away from the transition zone, the second ball socket body half has one axial end that merges into the first ball socket body half and another axial end that defines the ball socket opening, and the axial ends of the second ball socket body half have the same material thickness.

* * * * *